(12) United States Patent
Han et al.

(10) Patent No.: US 6,935,329 B2
(45) Date of Patent: Aug. 30, 2005

(54) COOKING APPARATUS

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Hahm, Seoul (KR); Joo-Yeong Yeo, Hwasung (KR); Han-Seong Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/682,548

(22) Filed: Oct. 10, 2003

(65) Prior Publication Data

US 2004/0134479 A1 Jul. 15, 2004

(30) Foreign Application Priority Data

Nov. 9, 2002 (KR) .............................. 10-2002-0069444
Feb. 6, 2003 (KR) .............................. 10-2003-0007559

(51) Int. Cl.[7] ............................................... A47J 37/00
(52) U.S. Cl. .................. 126/41 R; 126/9 R; 126/50; 99/447; 219/405; 392/422
(58) Field of Search ......................... 126/25 R, 41 R, 126/51, 9 R, 164, 40, 20, 50, 34, 51.9 R, 152 B; 99/447–450; 392/422; 219/405

(56) References Cited

U.S. PATENT DOCUMENTS

| | | | |
|---|---|---|---|
| 3,152,242 A | 10/1964 | De Mott | |
| 3,154,004 A | 10/1964 | Huck | |
| 4,632,089 A | * 12/1986 | Wardell | 126/25 R |
| 4,850,333 A | * 7/1989 | Dellrud et al. | 126/25 A |
| 5,189,945 A | 3/1993 | Hennick | |

FOREIGN PATENT DOCUMENTS

| | | |
|---|---|---|
| FR | 2 670 274 | 6/1992 |
| GB | 2 286 111 | 8/1995 |

OTHER PUBLICATIONS

Japanese Abstract 2001–120440 date May 8, 2001.
Japanese Abstract 2000–254007 dated Sep. 19, 2000.
Japanese Abstract 2000–166771 dated Jun. 20, 2000.
Japanese Abstract 03–026216 dated Feb. 4, 1991.
U.S. Appl. No. 10/736,836, filed Dec. 17, 2003, Han et al., Samsung Electronics Co. Ltd.
U.S. Appl. No. 10/659,380, filed Sep. 11, 2003, Han et al., Samsung Electronics Co., Ltd.
U.S. Appl. No. 10/681,132, filed Oct. 9, 2003, Han et al., Samsung Electronics Co., Ltd.
U.S. Appl. No. 10/681,136, filed Oct. 9, 2003, Han et al., Samsung Electronics Co., Ltd.
U.S. Appl. No. 10/706,926, filed Nov. 14, 2003, Han et al., Samsung Electronics Co., Ltd.
U.S. Appl. No. 10/687,603, filed Oct. 20, 2003, Han et al., Samsung Electronics Co., Ltd.
U.S. Appl. No. 10/689,746, filed Oct. 22, 2003, Han et al., Samsung Elelctronics Co., Ltd.

(Continued)

*Primary Examiner*—James C. Yeung
(74) *Attorney, Agent, or Firm*—Staas & Halsey LLP

(57) ABSTRACT

A cooking apparatus includes a body provided in a top thereof with an opening, at least one heating unit arranged on both sides of the body, a grill unit mounted on a top of the body, and a heat reflecting unit arranged toward the heating units below the opening of the body. The grill unit includes a plurality of grill pipes that are filled with water, arranged to be regularly spaced apart from each other and configured to form the effective grill portion. The heating unit includes a pair of heating units arranged on both sides of the body toward the opening of the body. The heating unit is arranged to be inclined at an angle ranging from 30° to 90° (preferably, about 70°) with respect to the effective grill portion of the grill unit. The heating unit is a ceramic heater.

15 Claims, 6 Drawing Sheets

OTHER PUBLICATIONS

U.S. Appl. No. 10/691,551, filed Oct. 24, 2003, Han et al., Samsung Electronics Co., Ltd.
U.S. Appl. No. 10/705,893, filed Nov. 13, 2003, Han et al., Samsung Electronics Co., Ltd.
U.S. Appl. No. 10/713,159, filed Nov. 17, 2003, Han et al., Samsung Electronics Co., Ltd.

Korean Patent Abstract for Publication No. 2002–16089, published Mar. 4, 2002.

Japanese Patent Abstract for Publication No. 11–267032, published Oct. 5, 1999.

* cited by examiner

COOKING APPARATUS

CROSS-REFERENCE TO RELATED APPLICATIONS

This application claims the priority of Korean Patent Application No. 2002-69444, filed Nov. 9, 2002, and Korean Patent Application No. 2003-7559, filed Feb. 6, 2003, in the Korean Intellectual Property Office, the disclosures of which are is incorporated herein by reference.

BACKGROUND OF THE INVENTION

1. Field of the Invention

The present invention relates generally to a cooking apparatus, and more particularly to a cooking apparatus to effectively transfer heat to food to be cooked, thereby improving an energy efficiency of the cooking apparatus and reducing a cooking time of the cooking apparatus.

2. Description of the Related Art

Generally, meat, such as beef and pork, and processed meat, such as sausage and ham, are most delicious when cooked in a grilling manner in which food is cooked by directly applying heat to the food while putting the food on a grill. Accordingly, people are fond of having meat and processed meat cooked in the grilling manner.

In general, a cooking apparatus that grills food includes a heating unit that applies heat to the food, and a grill unit on which the food is placed to be partially exposed to the heating unit. The cooking apparatus functions to cook the food by directly transferring the heat generated by the heating unit to the food placed on the grill unit.

When grilling meat such as beef, pork, or mutton, the meat cut into slices may be put on the grill unit with sauce formed of various condiments applied thereto. In this case, when the slices of meat mixed with the sauce are heated by heat transferred from the heating unit, oil contained in the slices of meat and the sauce applied to the meat may drop downward.

Consequently, an oil collecting unit is provided in a body of the cooking apparatus to collect heated oil and the sauce that drops downward from the slices of meat. The oil collecting unit is disposed under the grill unit to collect the oil and the sauce, and the heating unit is disposed between the grill unit and the oil collecting unit to cook the food by applying heat to the food.

However, the conventional cooking apparatus constructed as described above cooks food through the use of only heat transferred upward from the heating unit because the heating unit is disposed under the grill unit. Accordingly, the conventional cooking apparatus cannot effectively transfer heat to the food, so the conventional cooking apparatus has low energy efficiency and requires a lengthy cooking time.

Additionally, the conventional cooking apparatus is disadvantageous in that the grill unit is maintained at a high temperature by the heat received from the heating unit, so portions of food in contact with the heated grill unit may burn, thus deteriorating taste of the food and creating harm to the users' health.

SUMMARY OF THE INVENTION

Accordingly, it is an aspect of the present invention to provide a cooking apparatus, which is capable of allowing heat generated by a heating unit to be effectively transferred to food to be cooked, and which is capable of preventing oil and sauce generated in the process of cooking food from falling onto the heating unit.

Additional aspects and advantages of the invention will be set forth in part in the description which follows and, in part, will be obvious from the description, or may be learned by practice of the invention.

The foregoing and/or other aspects of the present invention are achieved by providing a cooking apparatus, including a body provided in a top thereof with an opening, at least one heating unit arranged in the body, a grill unit mounted on a top of the body, and a heat reflecting unit arranged toward the heating unit below the opening of the body, wherein the heating unit is arranged outside a region under an effective grill portion of the grill unit on which food is placed.

According to an aspect of the invention, the heating unit includes a pair of heating units arranged on both sides of the body toward the opening of the body, the heat reflecting unit includes a plurality of reflecting plates inclined toward the heating units, and the grill unit includes a plurality of grill pipes that are filled with water, arranged to be regularly spaced apart from each other and configured to form the effective grill portion.

According to an aspect of the invention, the heating unit is arranged to be inclined at an angle ranging from 30° to 90° (preferably, about 70°) with respect to the effective grill portion of the grill unit.

According to an aspect of the invention, the heating unit is a ceramic heater.

BRIEF DESCRIPTION OF THE DRAWINGS

The above and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
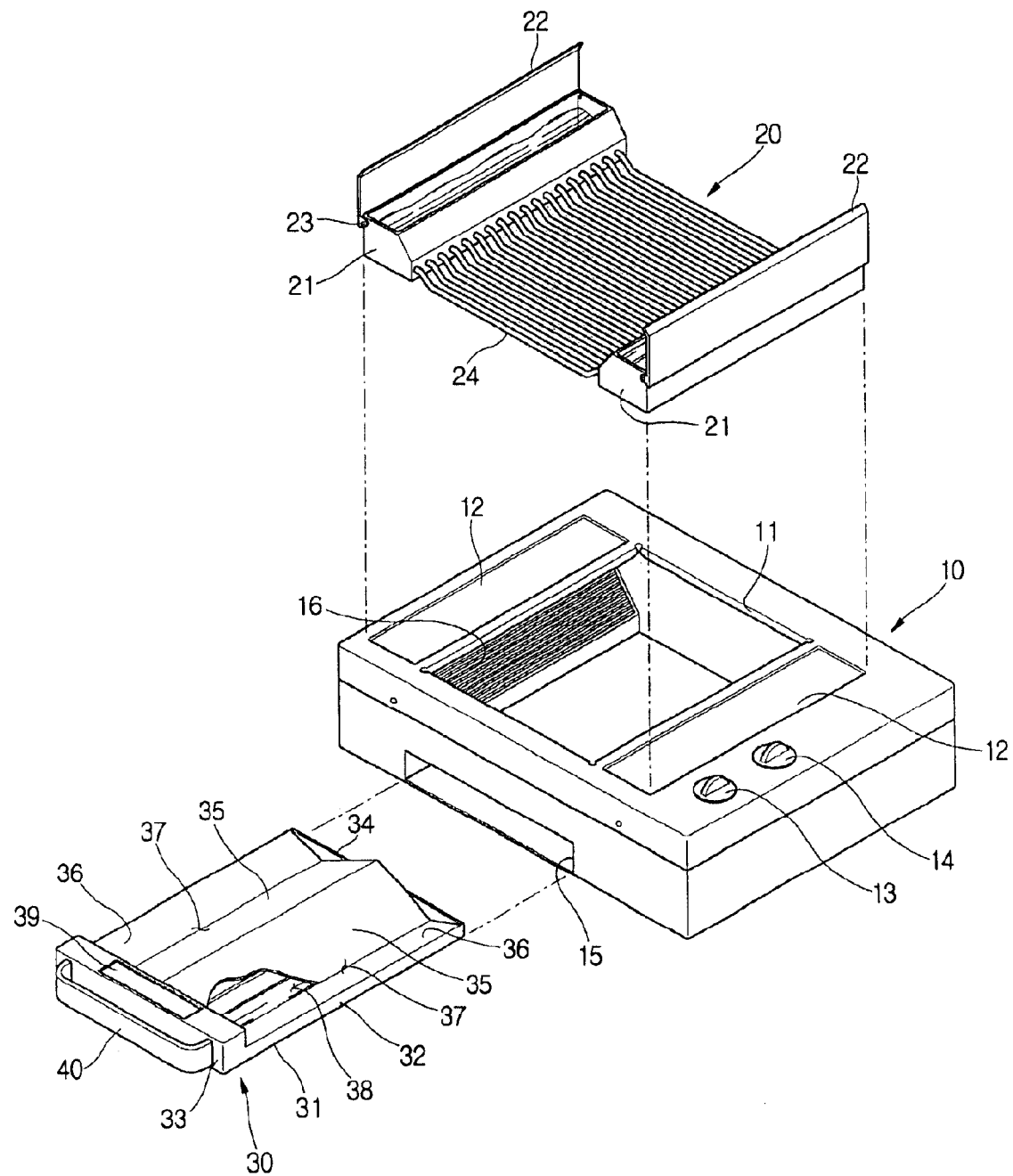
FIG. 1 is an exploded perspective view of a cooking apparatus, according to an embodiment of the present invention.

Reference will now be made in detail to the present preferred embodiments of the present invention, examples of which are illustrated in the accompanying drawings, wherein like reference numerals refer to like elements throughout.

Figure 2:
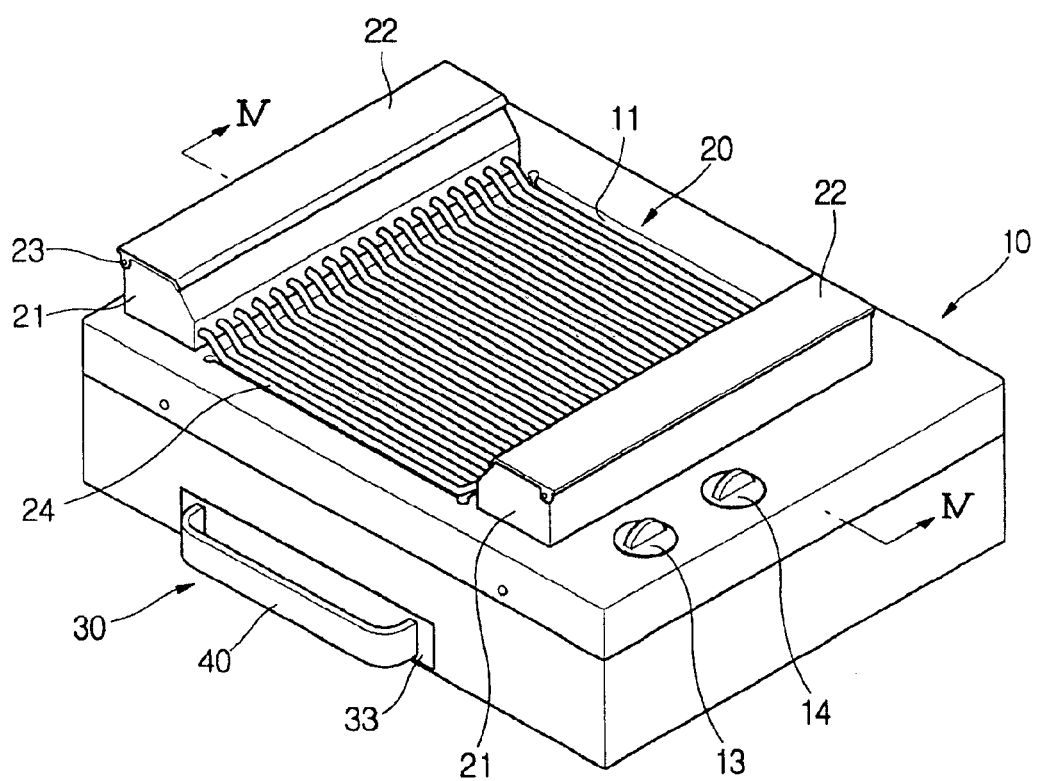
FIG. 2 is a perspective view of the cooking apparatus of FIG. 1.
Figure 3:
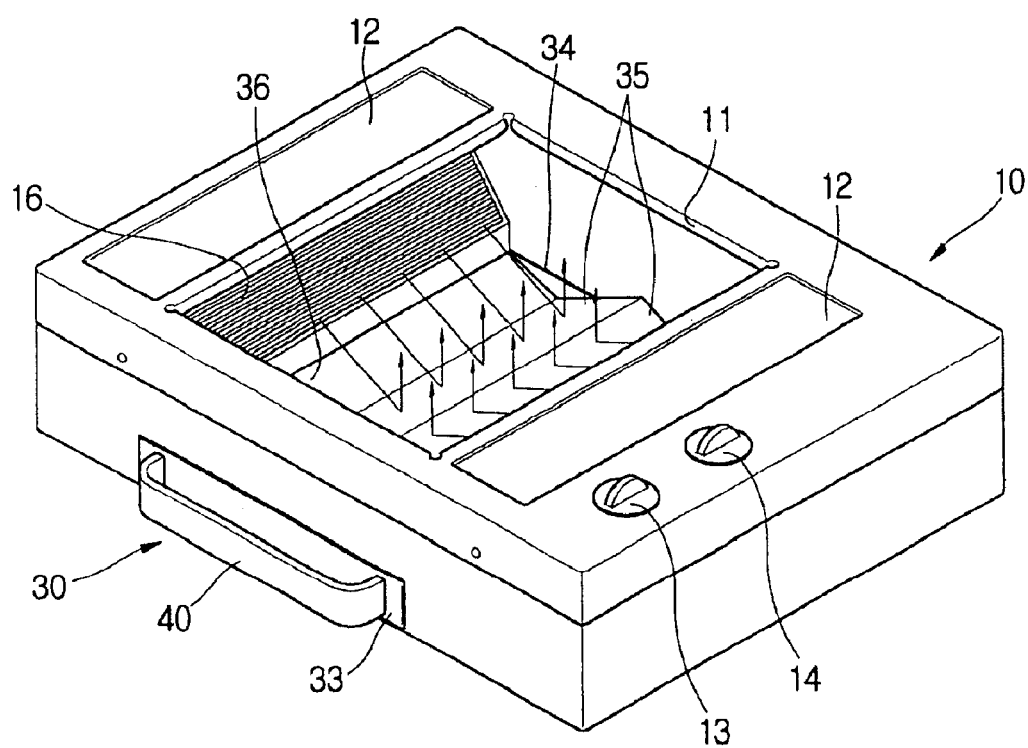
FIG. 3 is a perspective view of the cooking apparatus of FIG. 1 with a grill unit removed from a body to show an operation of a heat reflecting member.

FIG. 1 is an exploded perspective view of a cooking apparatus, according to an embodiment of the present invention. FIG. 2 is a perspective view of the cooking apparatus of FIG. 1. FIG. 3 is a perspective view of the cooking apparatus of FIG. 1 with a grill unit removed from a body to show an operation of a heat reflecting member.

As illustrated in FIGS. 1 through 3, the cooking apparatus of the present invention includes a body 10 constructed roughly in a box form, a plurality of heating units 16 disposed in the body 10 to apply heat to food to be cooked, a grill unit 20 seated on a top of the body 10 to allow the food to be put thereon, and a heat reflecting and oil collecting unit 30 positioned in a lower portion of the body 10 to transfer radiant heat to the grill unit 20. Simultaneously, the heat reflecting and oil collecting unit 30 may receive and collect oil generated from the food placed on the grill unit 20. Thus, the heat reflecting and oil collecting unit 30 is constructed by integrating a heat reflecting structure with an oil collecting structure. Accordingly, the heat reflecting and oil collecting unit 30 may be considered a combination of a heat reflecting unit and an oil collecting unit. Hereinafter, the heat reflecting and oil collecting unit 30 will be referred to as the "heat reflecting unit" for ease of description.

An opening 11 is provided in the top of the body 10 to allow heat generated from the heating units 16 to be transferred to the grill unit 20, and concave seat portions 12 are provided to both sides of the opening 11 to allow the grill unit 20 to be stably seated thereon. A timer switch 13 and a power switch 14 are provided on a portion of the top of the body 10 to adjust a heating time and temperature of the heating units 16. Further, a slot 15 is provided in a lower end portion of the body 10 to allow the heat reflecting unit 30 to be inserted and removed therethrough.

Figure 4:
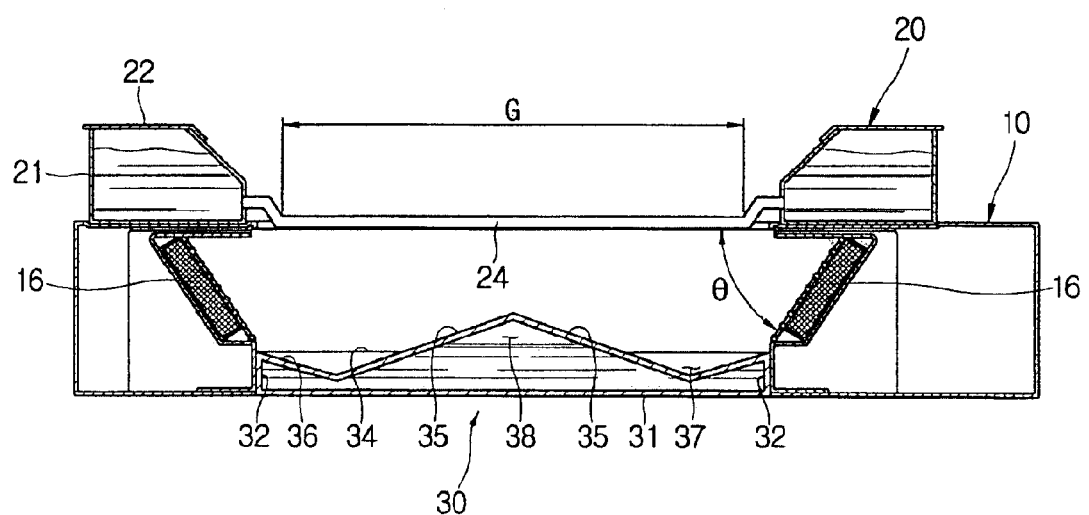
FIG. 4 is a sectional view taken along line IV—IV of FIG. 2 to show a configuration in which the heating units are arranged between the grill unit and the heat reflecting unit.

The heating units 16 form a pair, and are arranged on both sides of an interior of the body 10 to be inclined toward the opening 11 (see FIG. 4). The heating units 16 may be formed of gas heaters that generate heat by burning gas, or charcoal heaters that generate heat by burning charcoal. The heating units 16 are preferably formed of ceramic heaters in which electrothermal wires generating heat using electricity are encapsulated therein, so as to emit high-temperature heat and far infrared rays therefrom.

The grill unit 20 includes a pair of water tanks 21 that are spaced apart from each other to be seated on the seat portions 12, respectively, and a plurality of grill pipes 24 that are connected at both side ends thereof to the water tanks 21 to be filled with water.

A lid 22 is mounted on an open top of each of the water tanks 21 to selectively open and close the open top of the water tank 21 through the use of a hinge 23. Accordingly, when the lid 22 is closed after the water tank 21 is filled with water while the lid 22 is opened, the grill pipes 24 are filled with water. Accordingly, even though heat generated by the heating unit 16 is transferred to the grill pipes 24, portions of the food in contact with the grill pipes 24 do not burn.

The heat reflecting unit 30 includes a bottom plate 31 formed in a rectangular shape, two side plates 32 upwardly extending from both side edges of the bottom plate 31, and front and rear plates 33 and 34 upwardly extending from front and rear edges of the bottom plate 31.

A pair of reflecting plates 35 are provided above the bottom plate 31 to receive heat transferred from the heating units 16 and reflect the heat toward the grill pipes 24. The reflecting plates 35 are arranged to be inclined toward the heating units 16, respectively, and are connected at upper ends thereof to each other. The reflecting plates 35 are connected at lower ends thereof to lower ends of connecting plates 36, and the connecting plates 36 are connected at upper ends thereof to upper ends of the side plates 33 and 34.

A recess 37 is defined by each of the reflecting plates 35, each of the connecting plates 36, and the front and rear plates 33 and 34 to collect oil and sauce separated from the food. An inner space 38 is provided between the reflecting plates 35, the connecting plates 36 and the bottom plate 31.

The front plate 33 is formed to have a certain width, and is provided with a water inlet 39 in a top of the front plate 33. When water is fed into the water inlet 39, the inner space 38 of the heat reflecting unit 30 is filled with water. Accordingly, even though heat generated by the heating units 16 is transferred to the heat reflecting unit 30, oil collected within the recesses 37 and adhering to the reflecting plates 35 is prevented from burning.

A grip 40 is provided on a front of the front plate 33, so that the heat reflecting unit 30 is slidably moved to be inserted into or removed from an interior of the body 10 when a user selectively pushes and pulls the heat reflecting unit 30 through the slot 15 of the body 10.

Figure 5:
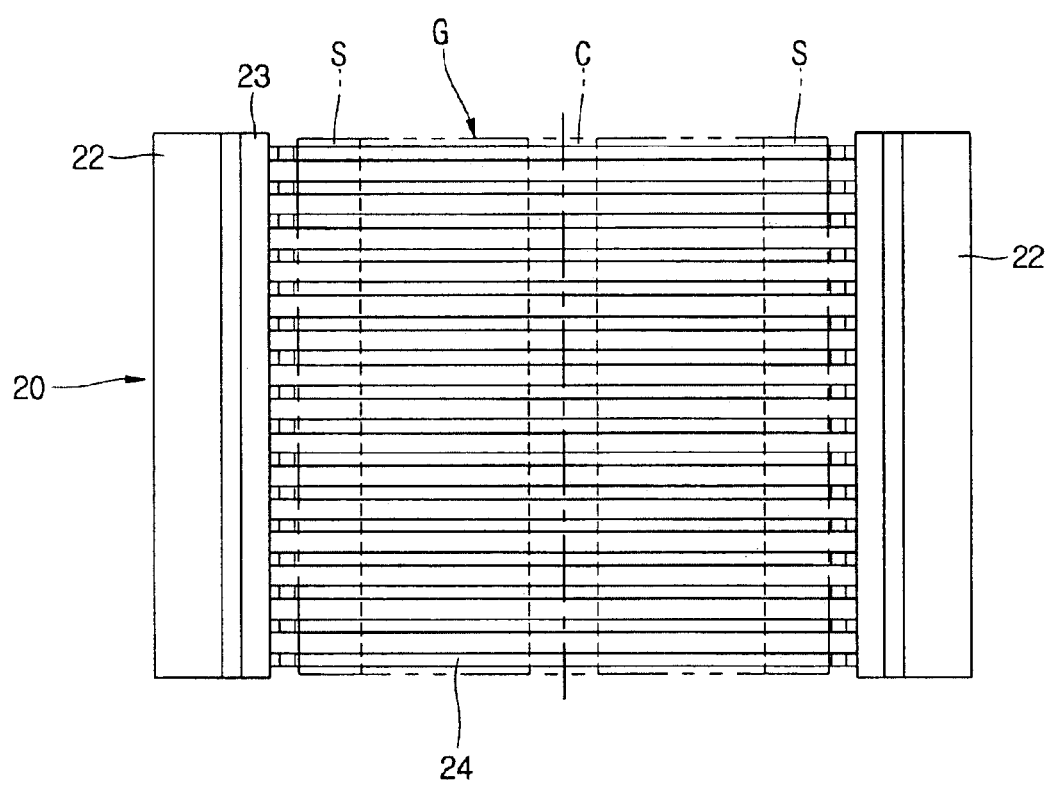
FIG. 5 is a plan view of the grill unit to show an effective grill portion G of FIG. 4.
Figure 6:
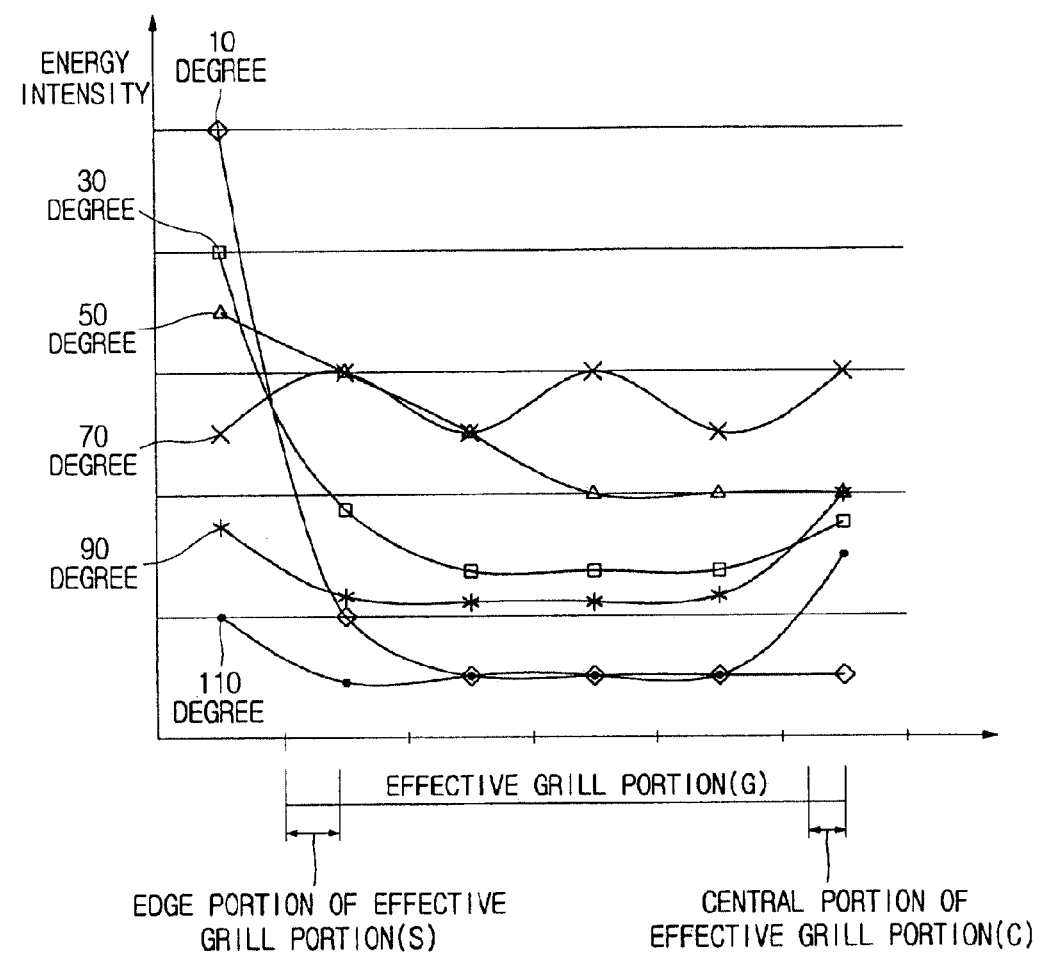
FIG. 6 is a graph showing variations of thermal energy, which is transferred from the heating units, between an edge portion and a central portion of the effective grill portion, depending upon installation angles of the heating units.

FIG. 4 is a sectional view taken along line IV—IV of FIG. 2 to show a configuration in which the heating units are arranged between the grill unit and the heat reflecting unit. FIG. 5 is a plan view of the grill unit to show an effective grill portion G of FIG. 4. FIG. 6 is a graph showing variations of thermal energy, which is transferred from the heating units, between an edge portion and a central portion of the effective grill portion, depending upon installation angles of the heating units.

As illustrated in FIG. 4, the heating members 16 are arranged outside a region under the effective grill portion G. In this case, the effective grill portion G, as shown in FIG. 5, denotes a portion of the grill unit 20 on which the food, such as meat or fish, is placed to be cooked. While the food is cooked on the grill unit 20, oil and sauce drop downward from the effective grill portion G.

As described above, the heating units 16 are arranged outside a region under the effective grill portion G of the grill unit 20, so that the oil and sauce separated from the food do not drop onto the heating units 16 but drop onto the reflecting plates 35 and connecting plates 36 of the heat reflecting unit 30, thereby collecting the oil and sauce within the recesses 37. As a result, removing the oil and sauce from the heating units 16 is not required and the heat transfer efficiency of the heating units 16 may be kept high.

Further, as shown in FIG. 6, an intensity of thermal energy varies depending upon an installation angle $\theta$ that the heating units 16 form with the effective grill portion G of the grill unit 20. Therefore, it is important to arrange the heating units 16 to have an appropriate installation angle $\theta$.

When the heating units 16 are arranged to be inclined near the effective grill portion G by making the installation angle of the heating units 16, which is formed by a line extending along a plane of the effective grill portion G and a line extending along the heating units 16, equal to or smaller than an angle of 30°, the heating units 16 are made to face an edge portion S of the effective grill portion G. Therefore, the heat generated by the heating units 16 is not effectively transferred to the effective grill portion G of the grill unit 20. Accordingly, when the heating units 16 are arranged at this installation angle, a larger amount of thermal energy is transferred to the edge portion S of the effective grill portion G, thus causing food placed on the edge portion S of the effective grill portion G to be cooked faster than normal and be burned. In contrast, a smaller amount of thermal energy is transferred to a central portion C of the effective grill portion G, so food placed on the central portion C is not desirably cooked.

When the heating units 16 are arranged to be inclined away from the effective grill portion G by making the installation angle of the heating units 16 equal to or greater than an angle of 90°, the heating units 16 are made to face the reflecting plates 35 of the heat reflecting unit 30, so that the heat generated by the heating units 16 is not effectively transferred to the effective grill portion G of the grill unit 20. Accordingly, when the heating units 16 are arranged at this installation angle, part of the heat reflected by the reflecting plates 35 is transferred to the central portion C of the effective grill portion G, thus causing food placed on the central portion C to be desirably cooked. In contrast, heat generated by the heating units 16 is not sufficiently transferred to remaining portions outside the central portion C including the edge portion S, so food placed on this portion is not desirably cooked.

When the heating units 16 are arranged at an installation angle ranging from 30° to 90°, part of the heat generated by the heating units 16 is directly transferred to the effective grill portion G, and at the same time part of the heat is reflected by the reflecting plates 35 and indirectly transferred to the effective grill portion G, so the heat generated by the heating units 16 is not effectively transferred to an entire region of the effective grill portion G.

Preferably, when the heating units 16 are arranged at an installation angle of about 70°, part of the heat generated by the heating units 16 is directly transferred to the entire region of the effective grill portion G and, at the same time, part of the heat is reflected by the reflecting plates 35 and indirectly transferred to the entire region of the effective grill portion G. Therefore, the heat generated by the heating units 16 may be not only effectively utilized but also transferred to the entire region of the effective grill portion G including the central portion C and the edge portion S.

Since the grill pipes 24 are filled with water, portions of food in contact with the grill pipes 24 do not burn and do not adhere to the grill pipes 24 even though heat is transferred from the heating unit 16 to the grill pipes 24.

As described above, in the cooking apparatus of the present invention, the heating units 16 are arranged at an appropriate angle with respect to the grill unit 20, and consequently heat generated by the heating units 16 is effectively transferred to the grill unit 20 on which food to be cooked is placed. Thus, the thermal efficiency of the cooking apparatus is increased, the cooking time of the cooking apparatus is shortened and the food is uniformly cooked on the entire region of the grill unit 20.

In addition, the cooking apparatus of the present invention is constructed so that the heating units 16 are arranged outside a region under the grill unit 20, so that oil and sauce separated from food in the process of cooking the food are prevented from dropping onto the heating units 16, thereby keeping the heating units 16 clean and effectively transferring heat generated by the heating units 16 to the grill unit 20.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:
    a body provided in a top thereof with an opening;
    at least one heating unit arranged in the body;
    a grill unit mounted on a top of the body; and
    at least one heat reflecting unit having at least one plate and arranged toward the at least one heating unit below the opening of the body,
    wherein the at least one heating unit is arranged outside a region under an effective grill portion of the grill unit on which food is placed, and
    wherein the at least on heating reflecting unit comprises a plurality of reflecting plates provided above the at least one plate and under a center portion of the grill unit.

2. The cooking apparatus as set forth in claim 1, wherein:
    the at least one heating unit comprises a pair of heating units respectively arranged on both sides of the body toward the opening of the body;
    the plurality of reflecting plates are respectively inclined toward the heating units; and
    the grill unit comprises a plurality of grill pipes that are filled with water, arranged to be regularly spaced apart from each other and configured to form the effective grill portion.

3. The cooking apparatus as set forth in claim 2, wherein the heating unit is arranged to be inclined at an angle ranging from 300 to 90° with respect to the effective grill portion of the grill unit.

4. The cooking apparatus as set forth in claim 3, wherein the heating unit is arranged to be inclined at an angle of about 700 with respect to the effective grill portion of the grill unit.

5. The cooking apparatus as set forth in claim 1, wherein each heating unit is a ceramic heater.

6. A cooking apparatus having a body, comprising:
    a plurality of heating units arranged in the body to apply heat to food placed on the grill unit;
    a grill unit mounted on a top of the body;
    an oil collecting unit to collect oil generated from the food placed on the grill unit; and
    a heat reflecting unit provided with a bottom plate and arranged toward the heating units to transfer radiant heat to the grill unit,
    wherein the heating units are arranged outside a region under an effective grill portion of the grill unit on which the food is placed, and
    wherein the heat reflecting unit comprises a pair of reflecting plates provided above the bottom plate to receive the heat transferred from the heating units and to reflect the heat toward the grill pipes.

7. The cooking apparatus according to claim 6, further comprising:
    an opening provided in the top of the body to allow heat generated from the heating units to be transferred to the grill unit;
    concave seating portions provided at both sides of the opening to allow the grill unit to be stably seated thereon;
    a timer switch provided on a portion of the body to adjust a heating time of the heating units;
    a power switch provided on another portion of the body to control a heating temperature of the heating units; and
    a slot provided in a portion of the body to allow the heat reflecting unit to be inserted and removed therethrough.

8. The cooking apparatus according to claim 6, wherein the heating units are formed of ceramic heaters having electrothermal wires to generate the heat using electricity so as to emit high-temperature heat and far infrared rays therefrom.

9. The cooking apparatus according to claim 6, wherein the grill unit comprises:

a pair of water tanks spaced apart from each other to be seated on the seating portions; and a plurality of grill pipes connected at both side ends thereof to the water tanks to be filled with water, preventing the food laid on the grill pipes from burning.

10. The cooking apparatus according to claim 9, wherein the heat reflecting unit comprises the bottom plate, two side plates to upwardly extend from both side edges of the bottom plate, and front and rear plates to upwardly extend from front and rear edges of the bottom plate.

11. The cooking apparatus according to claim 10, wherein the reflecting plates are arranged to be inclined toward the heating units and connected at one end to each other.

12. The cooking apparatus according to claim 11, further comprising:

connecting plates to connect to the reflecting plates and to the front and rear plates.

13. The cooking apparatus according to claim 12, further comprising:

a first recess defined by a first one of the reflecting plates, a first one of the connecting plates, and the front and rear plates; and a second recess defined by a second one of the reflecting plates, a second one of the connecting plates, and the front and rear plates, the first and second recesses being provided to collect the oil from the food.

14. The cooking apparatus according to claim 13, wherein the front plate of the heat reflecting unit is provided with a water inlet so that an inner space of the heat reflecting unit is filled with water, preventing the oil collected in the recesses from burning.

15. The cooking apparatus according to claim 10, further comprising:

a grip provided on the front plate to slidably move the heat reflecting unit in and out of the body.

* * * * *

UNITED STATES PATENT AND TRADEMARK OFFICE
CERTIFICATE OF CORRECTION

PATENT NO. : 6,935,329 B2  Page 1 of 1
APPLICATION NO. : 10/682548
DATED : August 30, 2005
INVENTOR(S) : Dae-Sung Han et al.

It is certified that error appears in the above-identified patent and that said Letters Patent is hereby corrected as shown below:

On The Title Page, Item (56)

Other Publications, replace "date" with --dated--, therefor;

Other Publications, after "Co." insert --,--, therefor;

Other Publications, replace "Elelctronics" with --Electronics--, therefor;

Column 6, line 23, replace "300" with --30°--, therefor;

Column 6, line 27, replace "700" with --70°--, therefor.

Signed and Sealed this

Twenty-second Day of January, 2008

JON W. DUDAS
*Director of the United States Patent and Trademark Office*